(12) United States Patent
Konrad

(10) Patent No.: US 10,744,594 B2
(45) Date of Patent: Aug. 18, 2020

(54) METHOD FOR PROCESSING A WORKPIECE

(71) Applicant: Konrad GmbH, Radolfzell (DE)

(72) Inventor: Michael Konrad, Radolfzell (DE)

(73) Assignee: Konrad GmbH, Radolfzell (DE)

( * ) Notice: Subject to any disclaimer, the term of this patent is extended or adjusted under 35 U.S.C. 154(b) by 0 days.

(21) Appl. No.: 15/387,728

(22) Filed: Dec. 22, 2016

(65) Prior Publication Data

US 2017/0173730 A1    Jun. 22, 2017

(30) Foreign Application Priority Data

Dec. 22, 2015  (DE) .................. 10 2015 122 586
Feb. 22, 2016  (DE) .................. 10 2016 103 055

(51) Int. Cl.
| | | |
|---|---|---|
| *B23K 26/03* | (2006.01) | |
| *B23K 26/34* | (2014.01) | |
| *B23K 26/342* | (2014.01) | |
| *B25J 9/16* | (2006.01) | |
| *B23K 101/00* | (2006.01) | |
| *B23P 6/00* | (2006.01) | |
| *B23K 101/18* | (2006.01) | |

(52) U.S. Cl.
CPC ............ *B23K 26/032* (2013.01); *B23K 26/34* (2013.01); *B23K 26/342* (2015.10); *B25J 9/1697* (2013.01); *B23K 2101/006* (2018.08); *B23K 2101/18* (2018.08); *B23P 6/00* (2013.01); *G05B 2219/45104* (2013.01)

(58) Field of Classification Search
CPC ............ B23K 2201/006; B23K 26/032; B23K 26/342; B25J 9/1697; G05B 2219/45104
See application file for complete search history.

(56) References Cited

U.S. PATENT DOCUMENTS

| | | |
|---|---|---|
| 6,516,693 B1 | 2/2003 | Thiele et al. |
| 6,668,692 B1 | 12/2003 | Thiele et al. |
| 8,537,371 B2 | 9/2013 | Steffensen et al. |
| 8,927,897 B2 | 1/2015 | Xu et al. |
| 9,625,899 B2 * | 4/2017 | Kuwahara ............ B25J 9/1671 |
| 9,782,895 B2 * | 10/2017 | Kanada ................. B25J 9/1656 |
| 2012/0120415 A1 | 5/2012 | Steffensen et al. |
| 2012/0121382 A1 | 5/2012 | Xu et al. |
| 2015/0081097 A1 * | 3/2015 | Som ...................... B25J 9/1656 700/257 |
| 2016/0114418 A1 * | 4/2016 | Jones ................... B62D 57/024 219/124.1 |

FOREIGN PATENT DOCUMENTS

| | | |
|---|---|---|
| DE | 196 14 418 C1 | 6/1997 |
| DE | 101 57 893 A1 | 6/2003 |
| DE | 11 2011 103 499 T5 | 11/2013 |
| DE | 11 2012 005 524 T5 | 9/2014 |
| WO | 2014/144946 A2 | 9/2014 |

* cited by examiner

*Primary Examiner* — Tu B Hoang
*Assistant Examiner* — Vy T Nguyen
(74) *Attorney, Agent, or Firm* — Bachman & LaPointe, PC

(57) ABSTRACT

In a method for processing a workpiece (2) using a tool (9), in particular for repairing a surface (4) using a laser, the tool (9) being piloted by a control element (10), the tool (9) is to be controlled via a position of the control element (10) and a pressure which is applied either to the control element (10) or by the control element (10).

9 Claims, 2 Drawing Sheets

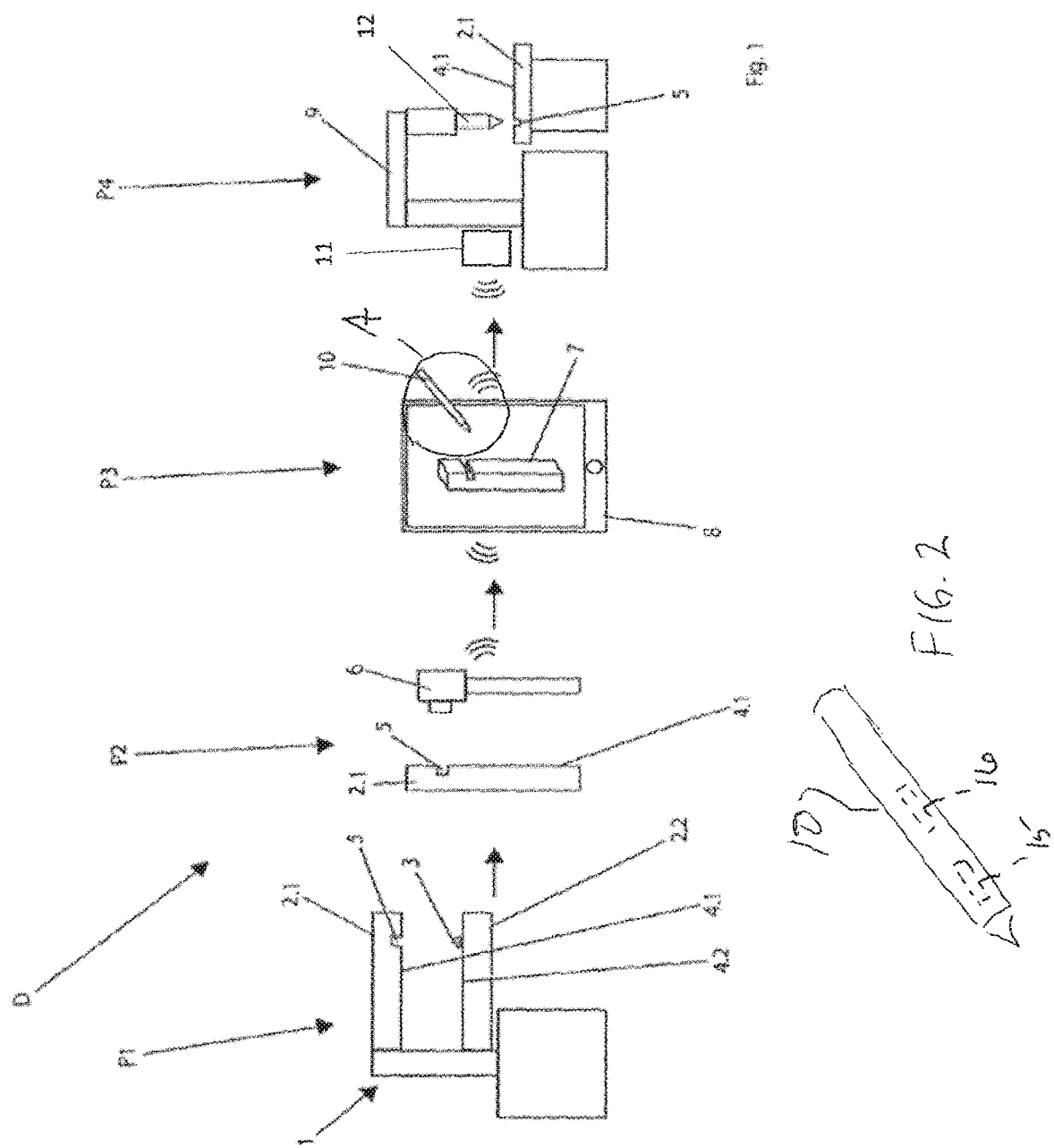

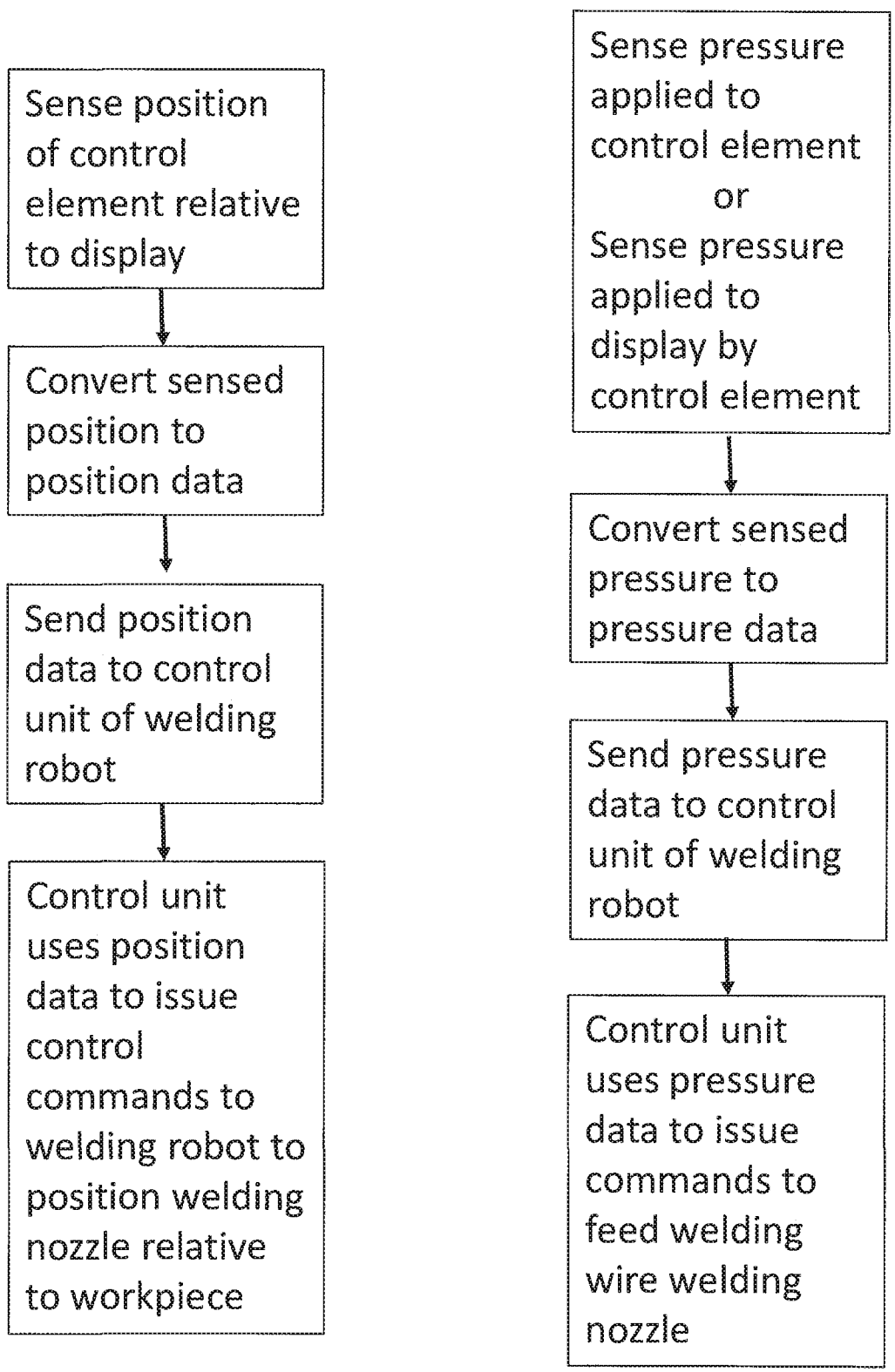

METHOD FOR PROCESSING A WORKPIECE

BACKGROUND OF THE INVENTION

The invention relates to a method for processing a workpiece using a tool, in particular for repairing a surface using a laser, the tool being piloted by a control element.

Methods of this kind for processing a workpiece using a tool, for example a laser, are known in a great many forms and embodiments. In that context, lasers can be used in many forms for the processing of workpieces, such as for cutting workpieces, hardening workpiece surfaces, or also for connecting workpieces by welding. In this processing method, it is often necessary to observe the workpiece region that is to be processed using an observation device, such as a microscope, in order to be able to guide with sufficient precision over the workpiece a laser beam that is used for processing. If the welding takes the form of deposition welding, in which a welding wire must be brought over the point that is to be welded, the use of such an observation device is practically indispensable in order to be able to guide the welding wire with sufficient precision.

DE 101 57 893 B4 describes such a method. This document relates to a laser processing apparatus having an optical observation device for observing a region, that is to be processed, of a workpiece. This invention has the drawback that the user must remain by the laser processing apparatus in order to monitor the to-be-processed region of the workpiece during the procedure.

What is significant, however, is that in many cases it is necessary to work with a laser of such power that it leads to the personnel being subject to impermissible exposure. For example, in the case of repairing a press in the automotive industry, use has to be made of a laser having a power of greater than 1 kW. The welder repairs the workpiece by holding the laser in one hand and, in the other hand, a feed wire whose material is transferred, after melting, into the location that is to be repaired. The high power of the laser makes this particularly hazardous, even potentially fatal, for the welder.

Due to the risk to the life of the user of a laser processing apparatus, it is important that the present invention reduce or entirely eliminate this substantial risk.

SUMMARY OF THE INVENTION

This problem is solved in that the tool is controlled via a position of the control element and a pressure which is applied either to the control element or by the control element.

First, this determines the position of the tool with respect to the to-be-processed workpiece by means of the position of the control element. However, the great advantage of the present invention lies in the fact that both the pressure and the position are determined by means of the control element, such that the welder can work beyond the region of the tool.

Described by way of example is a case from the production of an automotive part. For example, a luggage space lid is to be produced in a corresponding press. Production takes place between two dies. During production, it is possible for an object of some kind, for example a screw, to accidentally come between these two dies. This screw then presses into one of the dies, leaving a flaw.

In one process step according to the present invention, an image is now recorded of the to-be-processed region or the flaw in the workpiece. This can be a normal image or, as in the preferred exemplary embodiment, a 3D image.

This image appears on a display element, for example a screen, an iPad or even 3D glasses. The screen or iPad, or the 3D glasses, are able to move and need not be located in the same space as the workpiece that is to be processed. This has the considerable advantage that the user need not be in the same space as the dangerous laser.

In order to identify the position, in a preferred exemplary embodiment lines are stuck to the workpiece parallel to the tracks (flaws in the workpiece) that are to be welded. Image recognition will probably not recognize the exact position on the workpiece (reflections in the metal, no clear edges). For that reason, the stuck-on lines are used as an aid in order that the camera can establish the relation to the workpiece and the flaw. The welding robot then orients itself using the stuck-on lines, which are then removed after processing. The stuck-on lines can also be replaced with other objects such as fiducials (crosses, circles, etc.).

This method is required inter alia when the welding robot is not mounted in a fixed position and is thus moved over the workpiece. For that reason, the zero position of the robot is unknown with reference to the workpiece, which is then given by the stuck-on lines.

In another process step, the image is passed over by the "welder" using the control element. Since this takes place on the screen, it is clear to the user what areas have to be passed over, and how. This allows the welding work to be carried out with great precision.

Furthermore, in the preferred exemplary embodiment the control element is a stylus containing a sensor for its position and a pressure sensor. Holding a stylus in one's hand is the most natural thing in the world, which humans learn very early on and this is used by the preferred exemplary embodiment since the simple manipulation of a stylus makes it possible to pass over the welding track with great precision.

The tool, in this case a welding robot, is now positioned on the damaged workpiece, preferably close to the flaw. The control element or, in the preferred exemplary embodiment, the stylus now passes over the image. Changing the position of the stylus and the pressure exerted thereon or thereby determines the manner of the action and/or the intensity of the action of the welding robot. That is to say that the position data and the pressure data of the stylus are sent to the control unit of the welding robot and are converted into the position of the welding nozzle. The pressure that is exerted determines, in particular, a wire feed by means of which material is introduced into the flaw. In other words, this means that the welder uses the stylus to simulate the action that he or she would usually perform directly by hand using the corresponding welding robot.

The control element and the welding robot can—but need not—be in the same room. All devices are connected to one another, preferably wirelessly. This allows work to be very precise and, above all, ensures the safety of the user.

It should also be noted that, after the above-mentioned process steps, another image of the flaw can be recorded in order to verify whether the flaw has been eliminated. Any bumps can be ground away and errors can be corrected. That is to say that, after creation or processing, the welded flaw or weld seam is once again scanned using the camera in order to measure both the quality of the weld seam and the position. Again, this is performed by manually examining the tablet with or without comparison with the overlay of the CAD data (design model).

It is also conceivable to use the finger of the user, instead of the sensor in or on the stylus, for determining pressure/force. On the finger, the force that is applied to the stylus is also detected using a sensor.

During the entire process, it is of course also possible, if errors are identified, to intervene in the process and correct the action of the welding robot.

In another possible exemplary embodiment, it is also possible to use 3D glasses. This allows the user to control the welding action even while eliminating the flaw.

The above-described case from the automotive industry represents just one example. A great number of cases, in which the method according to the invention can be used, are conceivable. The present invention is intended to encompass all of these cases.

The invention also encompasses a device for carrying out the method.

BRIEF DESCRIPTION OF THE DRAWINGS

FIG. 1 schematically illustrates a system according to the invention;

FIG. 2 schematically illustrates a stylus in accordance with the invention; and

FIGS. 3 and 4 are flow charts showing control in accordance with the present invention.

DETAILED DESCRIPTION

Other advantages, features and details of the invention can be found in the following description of preferred exemplary embodiments and in the drawing, which shows, in FIG. 1, a schematic illustration of an apparatus according to the invention for processing a workpiece. This figure represents the schematic illustration D of the process according to the invention, with the process steps P1-P4.

The preferred exemplary embodiment shows, as first process step P1, a press 1, for example from the automotive industry. This tool has dies 2.1 and 2.2. If an object 3, for example a screw, were now to fall between the dies 2.1 and 2.2, and the dies 2.1 and 2.2 close, at least one surface 4.1 and/or 4.2 of at least one die 2.1 and/or 2.2 would suffer substantial damage, resulting in a flaw 5.

In order to repair this flaw 5, in a second process step P2 a camera 6, preferably a 3D camera, is moved to the flaw 5. This records a 3D image 7 of the damaged location.

In order to identify the position, in a preferred exemplary embodiment lines are stuck to the workpiece parallel to the tracks (flaws in the workpiece) that are to be welded. The stuck-on lines can also be replaced with other objects such as fiducials (crosses, circles, etc.).

The resulting image 7, or the resulting data, are now sent, in a third process step P3, to an image-reproducing device 8, in the preferred exemplary embodiment for example an iPad, touchpad or a screen. A special program opens and prepares the image data 7. Thus, the paths that are to be welded are predefined for the welding robot. Then, the welding robot later automatically passes over these paths.

The device 8 is assigned a control element 10, for See also FIG. 2, which is connected to a welding robot 9. This control element, or in the preferred exemplary embodiment a stylus 10, contains a sensor 15 for its position and a pressure sensor 16. This stylus 10 is now used to run over the flaw 5, the stylus 10 being moved just as a welding nozzle of the welding robot 9 would move in space. A change in the pressure applied to the stylus 10, or by means of the stylus 10 to the flaw 5, simulates the wire feed for the welding wire.

The user essentially welds the flaw 5 closed using the stylus 10. These data from the stylus 10 are sent to the welding robot 9 or its control unit, its welding nozzle and wire feed are correspondingly activated and thus the flaw 5 is welded closed.

The recorded image can also be compared with overlaid design data in order to constructively process the flaw, e.g. hole in the die, and to predefine, for the laser 12, the paths for filling (welding) the hole.

Thus, the image recorded by the camera is compared with the design data. Here, the user should interactively use the stylus to fill the holes or to draw the tracks to be welded, this information is then sent to the welding robot and executed. Here, the pressure on the stylus reproduces the feed of the welding wire, and thus defines the quantity of material for the welding seam or the filling of the holes.

The stylus 10 can also be used to draw entire welding tracks, which are saved in the computer and sent to the welding robot 9. These are then passed over by the welding robot 9.

The welding robot 9 can—but need not—be in the same room as the control element 10. In order to perform dangerous welding work, it is therefore possible—and also recommended—to control the welding robot 9 from an adjacent room.

Afterward, another image can be recorded in order to see whether the flaw 5 has been eliminated. Any bumps can be ground away and errors can be corrected.

It is also conceivable to use the finger of the user, instead of the sensor for determining pressure/force. On the finger, the force that is applied to the stylus 10 is also detected using a sensor.

During the entire process, it is of course also possible, if errors are identified, to intervene in the process and correct the action of the robot 9.

In another possible exemplary embodiment, it is also possible to use 3D glasses. This allows the user to control the welding action even while eliminating the flaw 5.

FIGS. 3 and 4 illustrate flow charts showing control of position (FIG. 3) and of wire feed rate (FIG. 4) following the steps as discussed above.

The invention claimed is:

1. A method for processing a workpiece (2) using a tool (9) having a welding robot with a laser (12), in particular for repairing a surface (4) of the workpiece (2) using the laser (12) to weld wire fed to the tool at a wire feed rate, the method comprising the steps of:
obtaining, with a camera, an image of a portion of the workpiece to be processed;
presenting the image on an image-reproducing device (8), wherein the image-reproducing device is a touchpad or a touchscreen;
piloting the tool (9) with a control element (10), wherein the control element is a stylus containing a position sensor and a pressure sensor, wherein a position of the tool (9) relative to the workpiece is controlled via a position of the control element (10) relative to the image-reproducing device (8), and wherein a pressure which is applied by the control element (10) to the image-reproducing device (8) controls the wire feed rate to the tool (9), wherein the control element (10) is connected to a controller of the tool (9), wherein the controller is configured to receive data of the control element (10) from the position sensor and the pressure sensor, which is executed by the controller to control the tool (9).

2. The method according to claim 1, wherein the position of the laser with respect to the workpiece (2) is determined by the position of the control element (10).

3. The method according to claim 1, wherein an image (7) of the region to be processed or of a flaw (5) in the workpiece (2) is created and is recorded by the control element (10).

4. The method according to claim 3, wherein the region to be processed or a flaw (5) is additionally labelled in order to control proper position of the tool relative to the region.

5. The method according to claim 3, wherein the image (7) is passed over by the control element (10).

6. The method according to claim 3, wherein the image (7) appears on a screen or 3D of the image-reproducing device (8).

7. The method according to claim 1, further comprising the following steps:
- the camera (6) is used to record an image (7) of the region to be processed or a flaw (5) in the workpiece (2);
- the image (7) is sent by the camera (6) to the image-reproducing device (8);
- the image (7) is represented visually on or in the device (8);
- the tool (9) is positioned facing the region (5), to be processed, of the workpiece (2);
- the image (7) is passed over by the control element (10);
- changing the position of the control element (10) and the pressure exerted thereby determines at least one of an action, or an intensity of the action, of the tool (9).

8. The method according to claim 7, wherein a welded flaw or weld seam is again scanned using the camera after creation or processing.

9. An apparatus for processing a workpiece (2) comprising a tool (9) having a welding robot with a laser (12), in particular for repairing a surface (4) of the workpiece (2) using the laser (12) to weld wire fed to the tool at a wire feed rate, a camera for obtaining an image of a portion of the workpiece to be processed, wherein the image is presented on an image-reproducing device (8), wherein the image-reproducing device is a touchpad or a touchscreen; wherein the tool (9) is piloted with a control element (10), wherein the control element is a stylus containing a position sensor and a pressure sensor, wherein a position of the tool (9) relative to the workpiece is controlled via a position of the control element (10) relative to the image-reproducing device (8), and wherein a pressure which is applied by the control element (10) to the image-reproducing device (8) controls the wire feed rate to the tool (9), wherein the control element (10) is connected to a controller of the tool (9), wherein the controller is configured to receive pressure data and position data of the control element (10) from the pressure sensor and the position sensor, respectively, which are executed by the controller to control the tool.

* * * * *